US006672245B2

(12) United States Patent
Ford

(10) Patent No.: US 6,672,245 B2
(45) Date of Patent: Jan. 6, 2004

(54) WALKING AID AND A WEAR INDICATING FOOT THEREFORE

(75) Inventor: Kerry John Ford, Perth (AU)

(73) Assignee: KDB Engineering, Malaga (AU)

( * ) Notice: Subject to any disclaimer, the term of this patent is extended or adjusted under 35 U.S.C. 154(b) by 0 days.

(21) Appl. No.: 10/197,510

(22) Filed: Jul. 17, 2002

(65) Prior Publication Data

US 2003/0019419 A1 Jan. 30, 2003

Related U.S. Application Data

(63) Continuation-in-part of application No. 09/671,506, filed on Sep. 27, 2000, now abandoned.

(51) Int. Cl.[7] ................................ G01D 21/00
(52) U.S. Cl. ................................ 116/208
(58) Field of Search ................................ 116/200, 202, 116/208, 209; 135/65, 66, 67, 68, 69, 77, 84, 85, 86, 82, 78, 81

(56) References Cited

U.S. PATENT DOCUMENTS 2,561,228 A * 7/1951 Richey ....................... 116/200
3,362,376 A * 1/1968 Norton ....................... 116/208
3,578,055 A * 5/1971 French ....................... 116/208
3,842,792 A * 10/1974 Souther ....................... 116/208
3,929,179 A * 12/1975 Hines ....................... 116/208
4,626,121 A * 12/1986 Tajima et al. ............... 116/208
5,377,710 A * 1/1995 Laser ....................... 135/78
5,796,349 A * 8/1998 Klein ....................... 116/208
5,947,053 A * 9/1999 Burnham et al. ........... 116/208

* cited by examiner

*Primary Examiner*—Christopher W. Fulton
*Assistant Examiner*—Travis Reis
(74) *Attorney, Agent, or Firm*—James Ray & Associates

(57) ABSTRACT

A wear indicating foot for use on the bottom of a leg of a mobility assisting device having a coupler for coupling the foot to the leg. A ground engaging base opposite the leg has a bottom surface for contact with the ground. An upper surface extends laterally from the coupler opposite the bottom surface. At least one void opening on the upper surface extends into the ground engaging base in a direction towards the bottom surface. The at least one void opening has a predetermined depth so that excessive wear of the bottom surface is indicated by the bottom surface contacting the void opening.

15 Claims, 4 Drawing Sheets

WALKING AID AND A WEAR INDICATING FOOT THEREFORE

CROSS-REFERENCE TO RELATED APPLICATION

This application is a continuation-in-part of patent application Ser. No. 09/671,506, filed Sep. 27, 2000, now abandoned.

FIELD OF THE INVENTION

The present invention relates, in general, to walking aids and ground engaging feet therefore. In Particular, this invention relates to a wear indicating foot for use on the bottom of a leg of a walking aid, such as a walking frame.

Walking frames are typically provided with one or more ground engaging feet. Depending on the specific purpose of each foot, it may be designed to provide minimal friction resistance to assist in facilitating a sliding motion. Hence the foot is often termed a guide. Since the foot engages the ground, it will eventually wear to the point where replacement is required, in order to ensure proper operation of the aid and avoid damage to both the ground engaging end of the aid and floor surfaces over which the aid traverses.

Often however, it is not possible to detect when the foot is approaching, or indeed beyond, the time for replacement. This is particularly so as the users of such walking aids may not have sufficient physical mobility or dexterity to maneuver themselves or the aids to a position to inspect the foot.

SUMMARY OF THE INVENTION

According to the present invention there is provided a wear indicating foot, for use on the bottom of a leg of a mobility assisting device, such foot comprising: a coupling means for coupling the foot to said leg.

A ground engaging base is attached to an end of the coupling means opposite the leg. Such base having a bottom surface for contact with the ground and an upper surface extending laterally from the coupling means substantially opposite the bottom surface. There is at least one void opening on the upper surface and extending into the base to a predetermined depth in a direction generally towards the bottom surface, whereby, in use, excessive wearing of the bottom surface is indicated when the bottom surface of the base is worn away to the extent that the bottom surface meets the void.

Preferably, the foot includes a plurality of voids spaced around the base. The voids may be evenly spaced around the base.

Preferably the base includes an attachment portion for connecting the foot to the leg and a replaceable wearing portion that includes the bottom surface. The attachment portion includes the upper surface and the at least one void.

Preferably the voids are in the form of a recessed hole. Alternatively, or in addition, the voids may be in the form of a notch in the side of the base portion.

In one embodiment, the replaceable wearing portion is pivotally attached to the attachment portion.

In order to provide a better understanding, a preferred embodiment of the present invention will now be described in detail, by way of example only, with reference to the accompanying drawings, in which.

Figure 1:
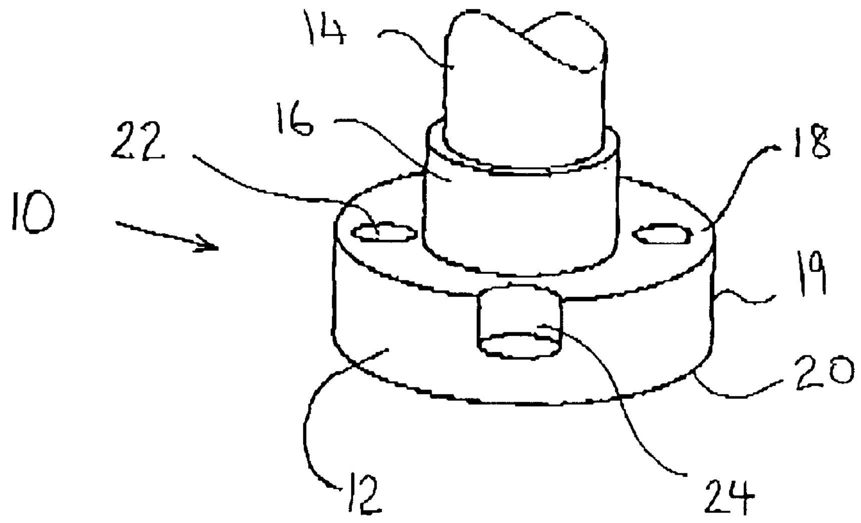
FIG. 1 is an upper perspective view of a wear indicating foot in accordance with the present invention.

Referring to FIG. 1, there is shown a foot or glide tip 10, which includes a ground engaging base portion 12. The foot 10 is coupled to a leg 14 of a mobility assisting device by a coupling means between the foot 10, cavity 15, and the leg 14, in the form of a tightly fitting sleeve portion 16. The base portion 12 is in the form of a cylinder having a top surface 18, a side wall 19 and bottom surface 20. The bottom surface 20 is arranged to make contact with the ground in use. Extending from the top surface towards the bottom surface are recessed holes 22 and a notch 24 in the side wall 19. The holes 22 and notch 24 are laterally spaced from the sleeve portion 16.

Figure 2:
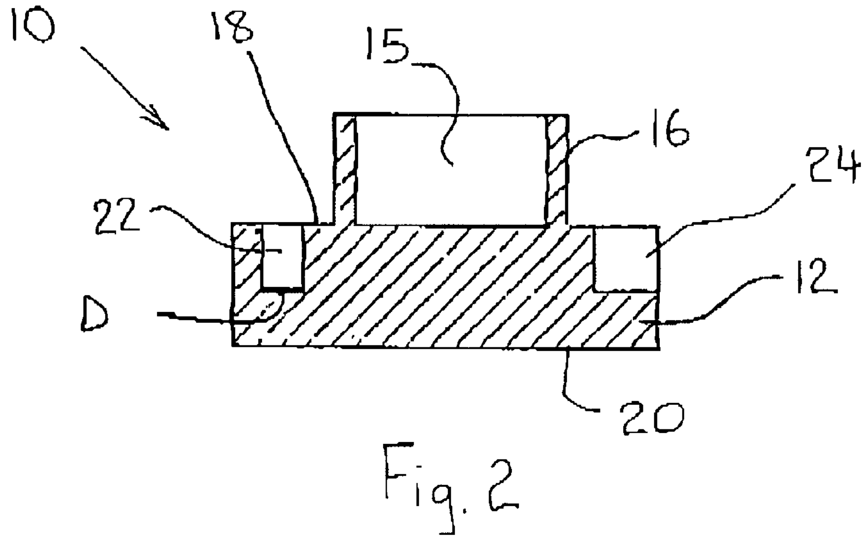
FIG. 2 is a cross-sectional side view of the wear indicating foot of FIG. 1.

As shown in FIG. 2, the recessed hole 22 and the notch 24 extends to a predetermined depth, indicated by D, into the base portion 12. The depth is determined so as to provide enough of the base portion 12 to wear to some extent, but when the bottom surface 20 of the base portion 12 has worn excessively the wearing of the bottom surface will reach the bottom of the hole 22 or notch 24 as indicated in FIG. 3 by 28.

Figure 3:
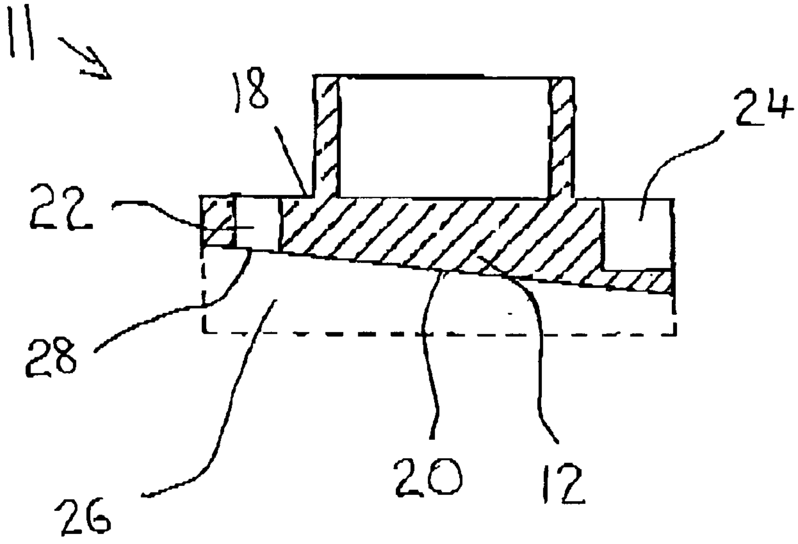
FIG. 3 is a cross-sectional side view of the foot of FIGS. 1 and 2, having been worn through use.

FIG. 3 shows a worn foot 11, which has its bottom surface 20, worn. The worn away section is indicated by 26. It is usual for wearing to be even, but at an angle to the horizontal. When the wearing of the base portion is excessive the bottom surface 26 will be worn away to the extent that it will meet the hole 22 or notch 24. In the case of the hole 22 this will be readily apparent as the ground will shown through the hole 22. The hole 22 or the notch 24 provides an easily detectible indication of when the base portion has become excessively worn. Without the hole (or notch), wearing of the base would not be readily detectable.

Figure 4:
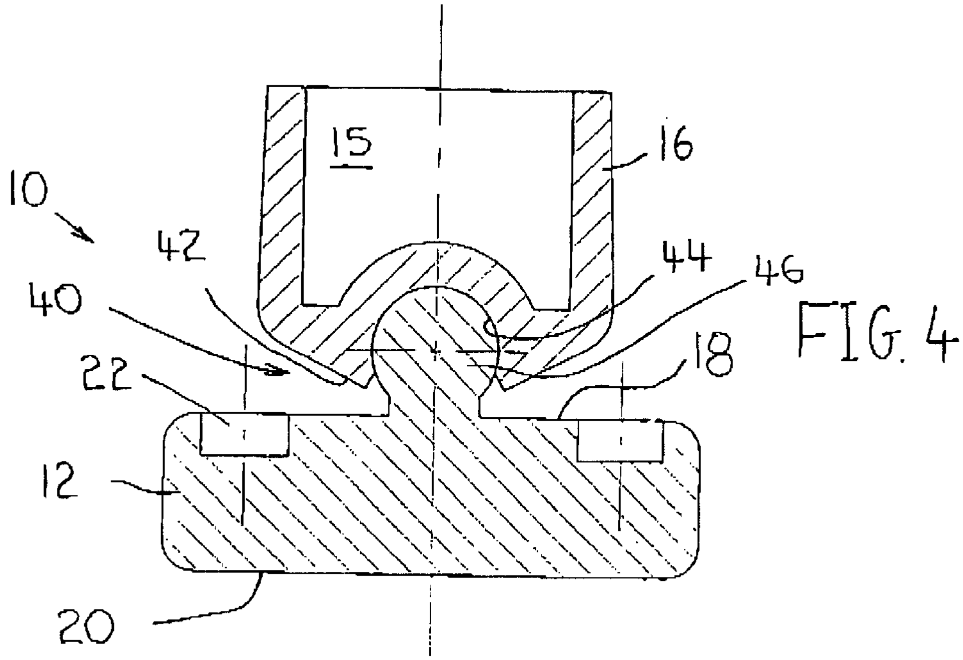
FIG. 4 is a cross-sectional side view of an alternative wear indicating foot, in accordance with the present invention, with a pivotal attachment between a base of the foot and a leg coupling means of the foot.
Figure 5:
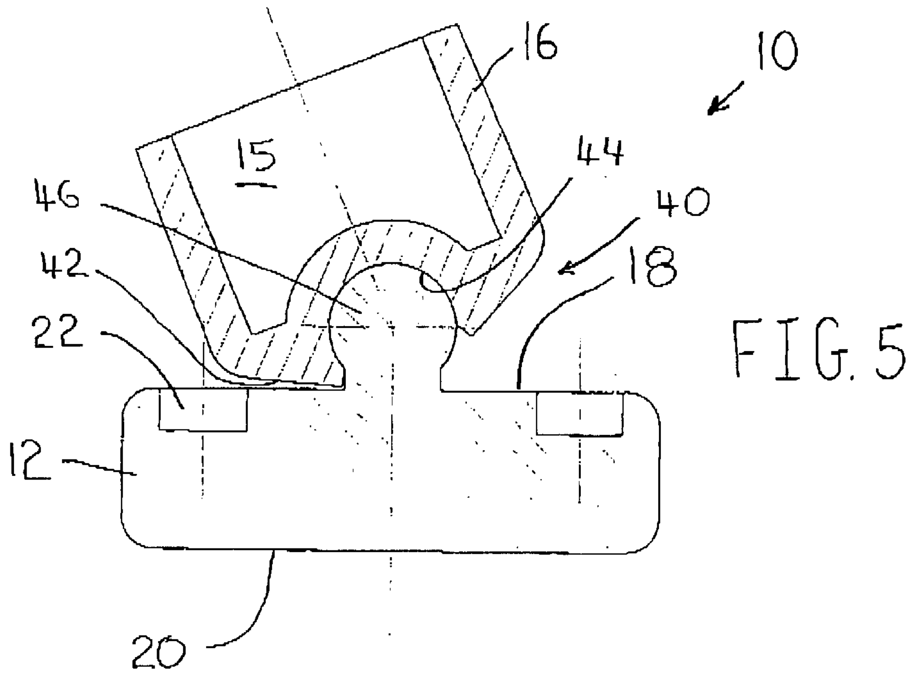
FIG. 5 is the foot of FIG. 4 showing the base in a pivoted position.

FIGS. 4 and 5 show an alternative embodiment of the foot 10, with the base portion 12 attached to the sleeve portion 16 by a universally pivoting joint 40 that allows the leg to engage ground at an angle or allows even wear on the base portion 12 when used on uneven ground.

The pivoting joint 40 includes a socket 44 in a bottom end 42 of the sleeve portion 16 and a ball 46 projecting from the top surface 18 of the base portion 12. The ball 46 is received in the socket 44 to form the joint 40. This type of foot 10 is often used in the device 1 shown in FIG. 6.

Figure 6:
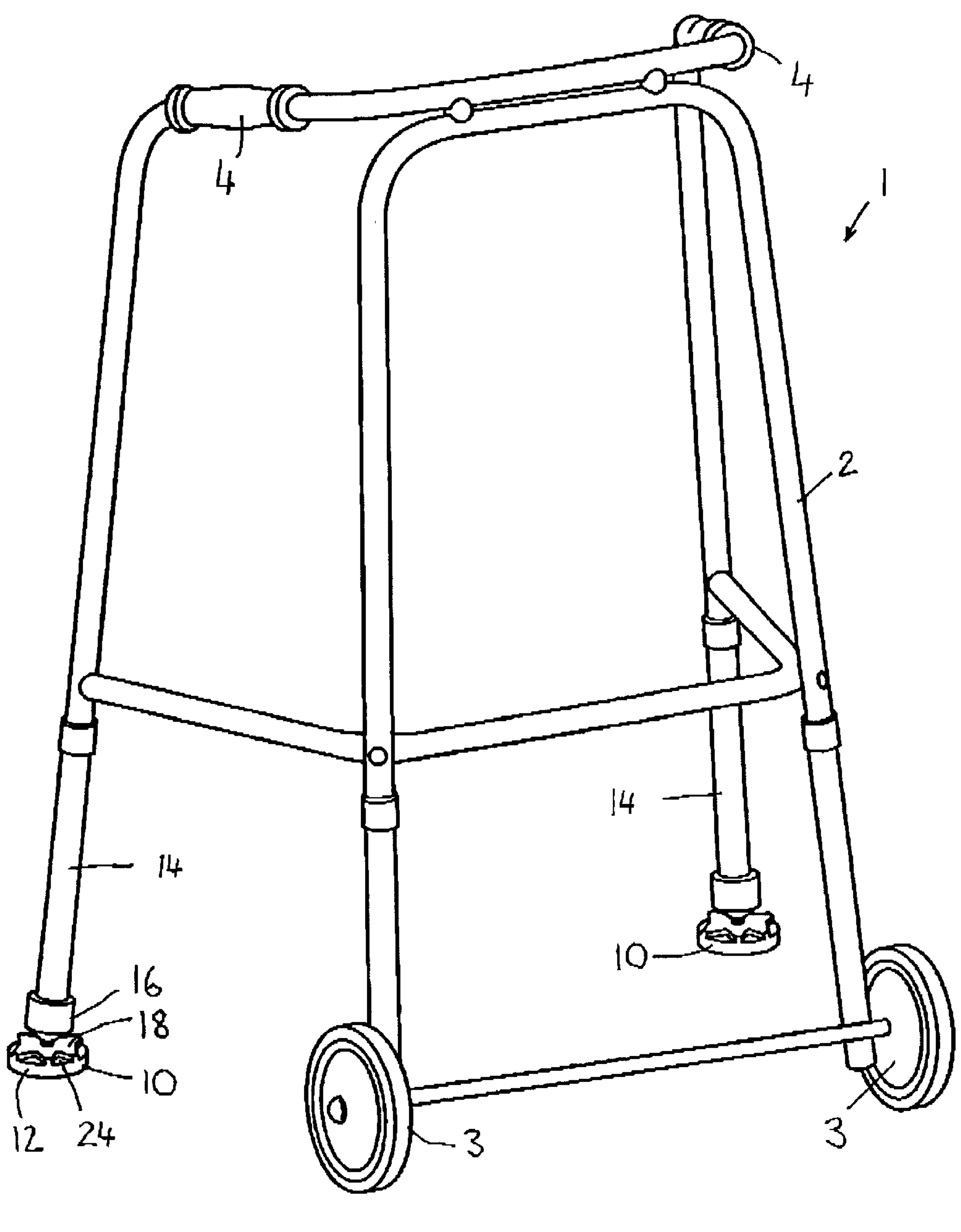
FIG. 6 is an upper perspective view of a mobility assisting device including a wear indicating foot of the present invention.

Referring to FIG. 6, there is shown a mobility assisting device 1 in the form of a walking frame. The frame 1 includes a framework 2 in the standard form for a walking frame, a pair of ground engaging wheels 3 at the front of the framework 2 and a pair of wear indicating feet 10 in the form of a glide, at a bottom end of respective rear legs 14 of the framework 2. A pair of handgrips 4 is shown on the top rear of the framework 2.

It will be clear to a skilled addressee that various modifications and variations can be made to the present invention, such as the number and position of voids within the base portion may be whatever is suitable; the base portion may be divided into two separate regions, the top region having the voids being of one color and the wearing region, below the depth of the voids, of another color so as to assist in the detection of wearing of the base portion has become excessive; the wearing region may be detachable from the top region so that a worn wearing region may be replaced, the replacement wearing region may engage the top region by means of, for example, a threaded screw or an interference connection. The shape of the foot may be disc-like, as shown, or rectangle, oblong with an upturned front end (commonly called a ski) or any other suitable shape.

All such modifications and variations are intended to be within the scope of the present invention, the nature of which is to be detemlined from the foregoing description.

I claim:

1. A wear indicating foot, for use on the bottom of a leg of a mobility assisting device, said foot comprising:

a coupling means for coupling the foot to said leg;

a ground engaging base attached to an end of the coupling means opposite the leg, said base having a bottom surface for contact with the ground and an upper surface extending laterally from the coupling means substantially opposite the bottom surface; and at least one void opening on the upper surface and extending into the base to a predetermined depth in a direction generally towards the bottom surface, whereby, in use, excessive wearing of the bottom surface is indicated when the bottom surface of the base is worn away to the extent that the bottom surface meets the void.

2. A wear indicating foot in accordance with claim 1, wherein the foot includes a plurality of voids spaced around the base.

3. A wear indicating foot in accordance with claim 2, wherein said plurality of voids are in the form of at least one of a notch in the side of the base portion, a recessed hole and a combination of at least one notch and at least one recessed hole.

4. A wear indicating foot in accordance with claim 1, wherein the base includes an attachment portion for connecting the foot to the leg and a replaceable wearing portion that includes the bottom surface, the attachment portion including the upper surface, and said at least one void opening.

5. A wear indicating foot in accordance with claim 1, wherein at said at least one void opening is in the form of at least one of a recessed hole, a notch and a combination of said recessed hole and said notch.

6. A wear indicating foot in accordance with claim 1, wherein a replaceable wearing portion is pivotally attached to the attachment portion.

7. A wear indicating foot in accordance with claim 1, wherein the base is in the form of a glide tip whereby said bottom surface glides over the ground in use.

8. A mobility assisting device, comprising:

at least one leg;

and a wear indicating foot, coupled to an end of at least one leg, paid wear indicating foot including:

a coupling means for coupling the foot to said leg;

a ground engaging base attached to the coupling means, said base having a bottom surface for contact with the ground and an upper surface extending laterally from the coupling means substantially opposite the bottom surface; and at least one void opening on the upper surface and extending into the base to a predetermined depth in a direction generally towards the bottom surface, whereby, in use, excessive wearing of the bottom surface is indicated when the bottom surface of the base is worn away to the extent that the bottom surface meets the void opening.

9. A mobility assisting device in accordance with claim 8, wherein the mobility assisting device includes a plurality of voids spaced around the base.

10. A mobility assisting device in accordance with claim 8, wherein the base includes a first portion attached to the coupling means and a second portion that includes the bottom surface, the first portion including the upper surface and said at least one void opening.

11. A mobility assisting device in accordance with claim 10 wherein the first portion is pivotally coupled to the second portion.

12. A mobility assisting device in accordance with claim 8, wherein said at least one void opening is in the form of a recessed hole.

13. A mobility assisting device in accordance with claim 8, wherein said at least one void opening is in the form of a notch in the side of the base.

14. A mobility assisting device in accordance with claim 8, wherein the base is in the form of a glide tip whereby said bottom surface glides over the ground in use.

15. A walking frame comprising:

a framework having at least two support legs;

at least one of said support legs having a respective wear indicating foot coupled thereto;

paid wear indicating foot including;

a coupling means for coupling said respective foot to said leg;

a ground engaging base attached to the coupling means, said base having a bottom surface for contact with the ground and an upper surface extending laterally from the coupling means substantially opposite the bottom surface; and at least one void opening on the upper surface and extending into the base to a predetermined depth in a direction generally towards the bottom surface, whereby, in use, excessive wearing of the bottom surface is indicated when the bottom surface of the base is worn away to the extent that the bottom surface meets the void.

* * * * *